United States Patent
Kamal

(10) Patent No.: US 10,133,773 B2
(45) Date of Patent: Nov. 20, 2018

(54) METHODS AND SYSTEMS FOR INDIRECTLY RETRIEVING ACCOUNT DATA FROM DATA STORAGE DEVICES

(75) Inventor: Mohammed Kamal, Troy, MI (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 830 days.

(21) Appl. No.: 12/622,678

(22) Filed: Nov. 20, 2009

(65) Prior Publication Data

US 2011/0125642 A1 May 26, 2011

(51) Int. Cl.
| | |
|---|---|
| *G06Q 20/04* | (2012.01) |
| *G06F 17/30* | (2006.01) |
| *G06Q 20/12* | (2012.01) |
| *G06Q 20/20* | (2012.01) |
| *G06Q 20/24* | (2012.01) |
| *G06Q 20/40* | (2012.01) |

(52) U.S. Cl.
CPC ....... *G06F 17/30424* (2013.01); *G06Q 20/04* (2013.01); *G06Q 20/12* (2013.01); *G06Q 20/20* (2013.01); *G06Q 20/24* (2013.01); *G06Q 20/40* (2013.01)

(58) Field of Classification Search
CPC .................................................. G06Q 20/40
USPC .......................................................... 705/44
See application file for complete search history.

(56) References Cited

U.S. PATENT DOCUMENTS

| | | | |
|---|---|---|---|
| 6,341,302 B1 * | 1/2002 | Celis .................. | G06F 9/546 |
| | | | 707/999.008 |
| 7,194,438 B2 | 3/2007 | Sovio et al. | |
| 7,287,695 B2 | 10/2007 | Wankmueller | |
| 7,374,082 B2 | 5/2008 | Van de Velde et al. | |
| 2004/0139018 A1 * | 7/2004 | Anderson et al. .............. 705/41 |
| 2006/0149671 A1 * | 7/2006 | Nix et al. ......................... 705/40 |
| 2007/0171921 A1 * | 7/2007 | Wookey et al. ............. 370/401 |
| 2008/0011820 A1 | 1/2008 | Brown et al. | |
| 2008/0040285 A1 * | 2/2008 | Wankmueller .................. 705/67 |
| 2008/0243529 A1 * | 10/2008 | Fischer .............................. 705/1 |

* cited by examiner

*Primary Examiner* — Cho Kwong
(74) *Attorney, Agent, or Firm* — Armstrong Teasdale LLP

(57) ABSTRACT

A method and system for processing an electronic payment transaction is described herein. The method uses a first computer device configured to access account data from a database subsystem operating at a second computer device. The method includes operating a transaction messaging system (TMS) in a first computer operating environment of the first computer device, operating an account data access system (ADAS) in a second computer operating environment of the first computer device, transmitting a request for account data from the TMS to the ADAS, executing a query for the account data at the database subsystem wherein the query is generated by the ADAS and based on the request for account data, receiving the requested account data at the TMS in response to the query, and processing the payment transaction at the TMS using the received account data.

30 Claims, 7 Drawing Sheets

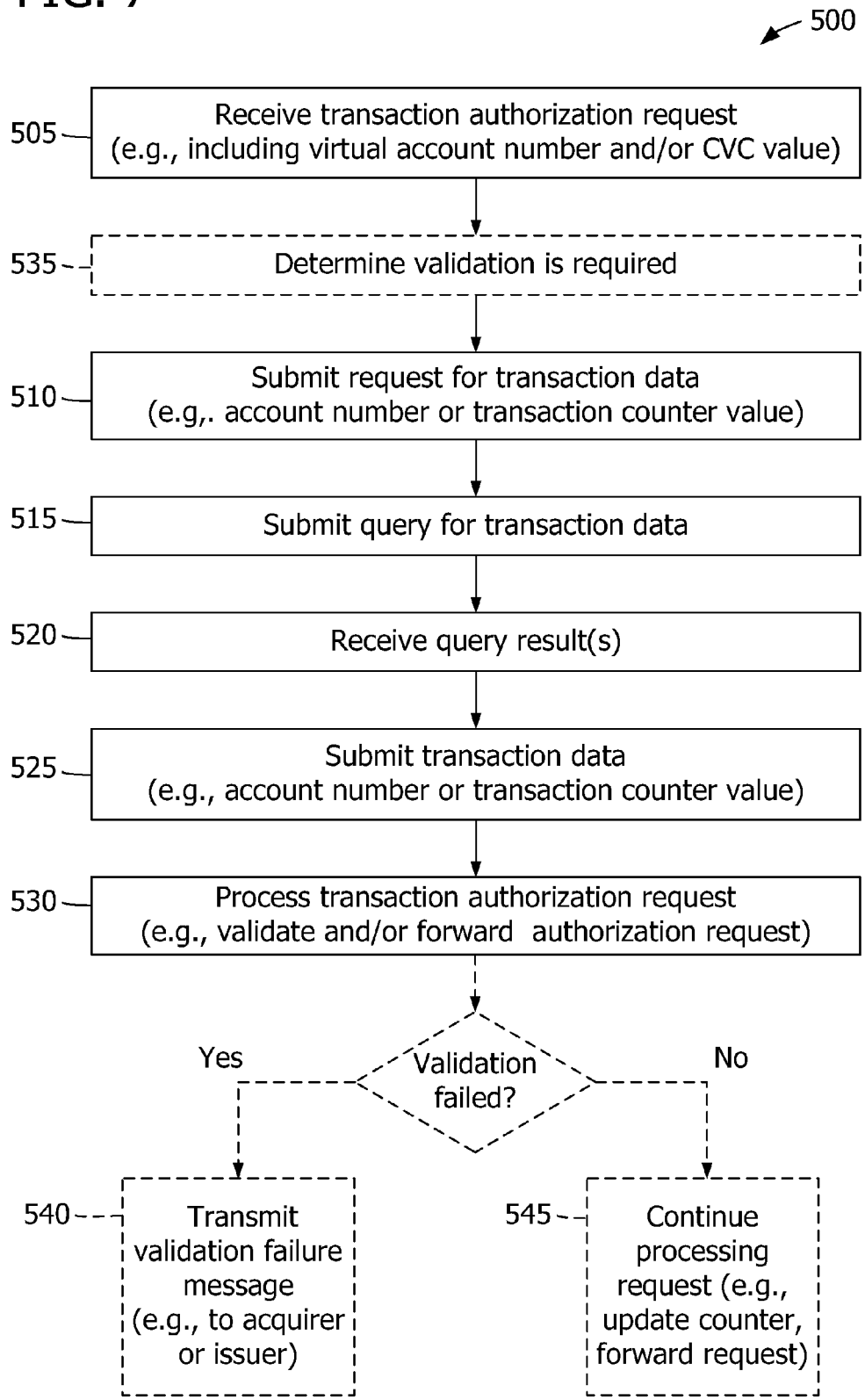

METHODS AND SYSTEMS FOR INDIRECTLY RETRIEVING ACCOUNT DATA FROM DATA STORAGE DEVICES

BACKGROUND OF THE INVENTION

The field of the present disclosure relates generally to processing transaction data and, more particularly, to computer-based methods and systems for indirectly retrieving account data from data storage devices while processing a financial transaction initiated by a cardholder using a payment card.

A known, multi-party payment process includes a merchant offering a good or service, a cardholder wishing to purchase or otherwise acquire the good or service using a payment card, an acquirer bank associated with the merchant, an issuer bank that issued the payment card to the cardholder, and a payment network (also known as an interchange network) associated with both the acquirer and the issuer for processing the payment transaction. In at least some known cases, the payment card may be a credit card or a debit card. The interchange network must be able to process both types of payment transactions. Therefore, in at least some known cases, the interchange network may have two separate computer systems, one for processing credit type transactions and one for processing debit type transactions.

The cardholder presents a payment card to the merchant at a point of interaction device, also known as a point of sale (POS) device or terminal. For example, the payment card may include a credit card, a debit card, a key fob, or a mobile phone, which may be used to initiate a transaction with the merchant. A POS terminal may be human-operated (e.g., a cash register) or automated (e.g., a vending machine). The payment card provides cardholder data, including a primary account number (PAN), to the POS terminal. The POS terminal combines the cardholder data with purchase data to create transaction data. The POS terminal includes the transaction data in a transaction authorization request message, which it transmits to the acquirer. The acquirer forwards the transaction authorization request message to the interchange network. The interchange network, in turn, forwards the transaction authorization request message to the issuer.

The issuer determines whether the transaction should be authorized based on the transaction data and other data stored with the issuer. For example, the issuer may determine whether an account associated with the PAN contains sufficient funds for a payment amount included in the transaction data. The issuer transmits an authorization response message indicating whether the transaction is authorized or denied to the interchange network. The interchange network forwards the authorization response message to the acquirer, and the acquirer forwards the authorization response message to the merchant. If the authorization request response message indicates that the transaction is authorized, the merchant completes the transaction with the cardholder.

In some situations, the interchange network requires access to account data prior to forwarding an authorization request message from the acquirer to the issuer. However, the account data may not be stored by or directly available to the portion of the interchange network system that is responsible for forwarding authorization request messages and authorization response messages. For example, an interchange network may include two separate processing systems, namely a credit transaction processing system, and a debit transaction processing system. Although these processing systems are configured to process different types of transactions with potentially different types of data and different protocols, these systems must also be able to communicate with one another. If these two processing systems were unable to communicate with one another, the results may include massive data duplication, potentially inaccurate data, a greater potential for fraud, increased computer hardware requirements, additional software, and greater overall expense. Accordingly, a computer device is needed to allow the different transaction processing systems to communicate with one another, including the ability of one system to retrieve data stored on the other system.

BRIEF DESCRIPTION OF THE INVENTION

In one aspect, a method for processing an electronic payment transaction is provided. The method uses a first computer device configured to access account data from a database subsystem operating at a second computer device. The method includes operating a transaction messaging system (TMS) in a first computer operating environment of the first computer device, operating an account data access system (ADAS) in a second computer operating environment of the first computer device, transmitting a request for account data from the TMS to the ADAS, executing a query for the account data at the database subsystem wherein the query is generated by the ADAS and based on the request for account data, receiving the requested account data at the TMS in response to the query, and processing the payment transaction at the TMS using the received account data.

In another aspect, a system for use in processing an electronic payment transaction is provided. The system includes a first computer device comprising a processor, a first computer operating environment programmed to execute a transaction messaging system (TMS), and a second computer operating environment programmed to execute an account data access system (ADAS). The system further includes a database subsystem for storing data wherein the database subsystem executes at a second computer device. The first computer device is configured to transmit a request for account data from the TMS to the ADAS, execute a query for the account data at the database subsystem wherein the query is generated by the ADAS and based on the request for account data, receive the requested account data at the TMS in response to the query, and process the payment transaction at the TMS using the received account data.

In another aspect, a computer program embodied on a computer readable medium for processing an electronic payment transaction is provided. The transaction is processed over a first computer device that includes a processor, a first computer operating environment programmed to execute a transaction messaging system (TMS), and a second computer operating environment programmed to execute an account data access system (ADAS). The first computer device is coupled to a database subsystem executing at a second computer device. The program includes at least one code segment that instructs the first computer device to transmit a request for account data from the TMS to the ADAS, execute a query for the account data at the database subsystem wherein the query is generated by the ADAS and based on the request for account data, receive the requested account data at the TMS in response to the query; and process the payment transaction at the TMS using the received account data.

In another aspect, a system for use in processing an electronic payment transaction is provided. The system includes a first computer device comprising a processor, a first computer operating environment programmed to execute a transaction messaging system (TMS), and a second computer operating environment programmed to execute an account data access system (ADAS). The first computer device is a debit transaction processing device. The system further includes a database subsystem for storing data executing at a second computer device. The second computer device is a credit transaction processing device. The debit transaction processing device is configured to receive, at the TMS, a debit transaction authorization request corresponding to the payment transaction wherein the authorization request includes a card verification code (CVC) value and an account number, transmit a request for account data from the TMS to the ADAS, and execute a query for the account data at the database subsystem operating at the credit transaction processing device wherein the query includes the CVC value and the account number. The debit transaction processing device is further configured to receive the requested account data at the TMS in response to the query wherein the account data includes at least one of a transaction counter value and a primary account number, validate the payment transaction using the transaction counter value, and process the validated payment transaction at the TMS using the received account data including the primary account number.

BRIEF DESCRIPTION OF THE DRAWINGS

FIG. 7 is a flowchart of an exemplary process for processing a transaction in connection with the transaction processing system shown in FIG. 6, in accordance with one embodiment of the present invention.

DETAILED DESCRIPTION OF THE INVENTION

The methods and systems described herein relate to a transaction processing system that is configured to receive a transaction authorization request message by a transaction messaging system, retrieve account data that is not directly accessible by the transaction messaging system, and process the transaction authorization request message based on the retrieved account data.

Specifically, one of the embodiments described herein includes a debit transaction processing system and a credit transaction processing system, which utilize different data and/or different communication protocols. The credit transaction processing system is associated (e.g., via a database server) with at least one data storage device for storing account data, such as, but not limited to, account numbers and transaction counter values for cardholders. The debit transaction processing system requires at least some of the account data in order to process debit transactions. However, due to software availability and limitations, system incompatibility, security constraints, and/or other restrictions, the debit transaction processing system may not be able to directly access the credit transaction processing system and/or the data storage device. The methods and systems described herein allow these different transaction processing systems to communicate with each other by sharing account data.

The methods and systems described herein have a technical effect of facilitating communication between a transaction messaging system executing on a first server computer device and at least one database subsystem provided by a second server computer device. Other technical effects, which are described herein, include transaction validation, mapping a "virtual" PAN to an actual PAN, database connection management, and process management between two computer operating environments on the first host.

Figure 1:
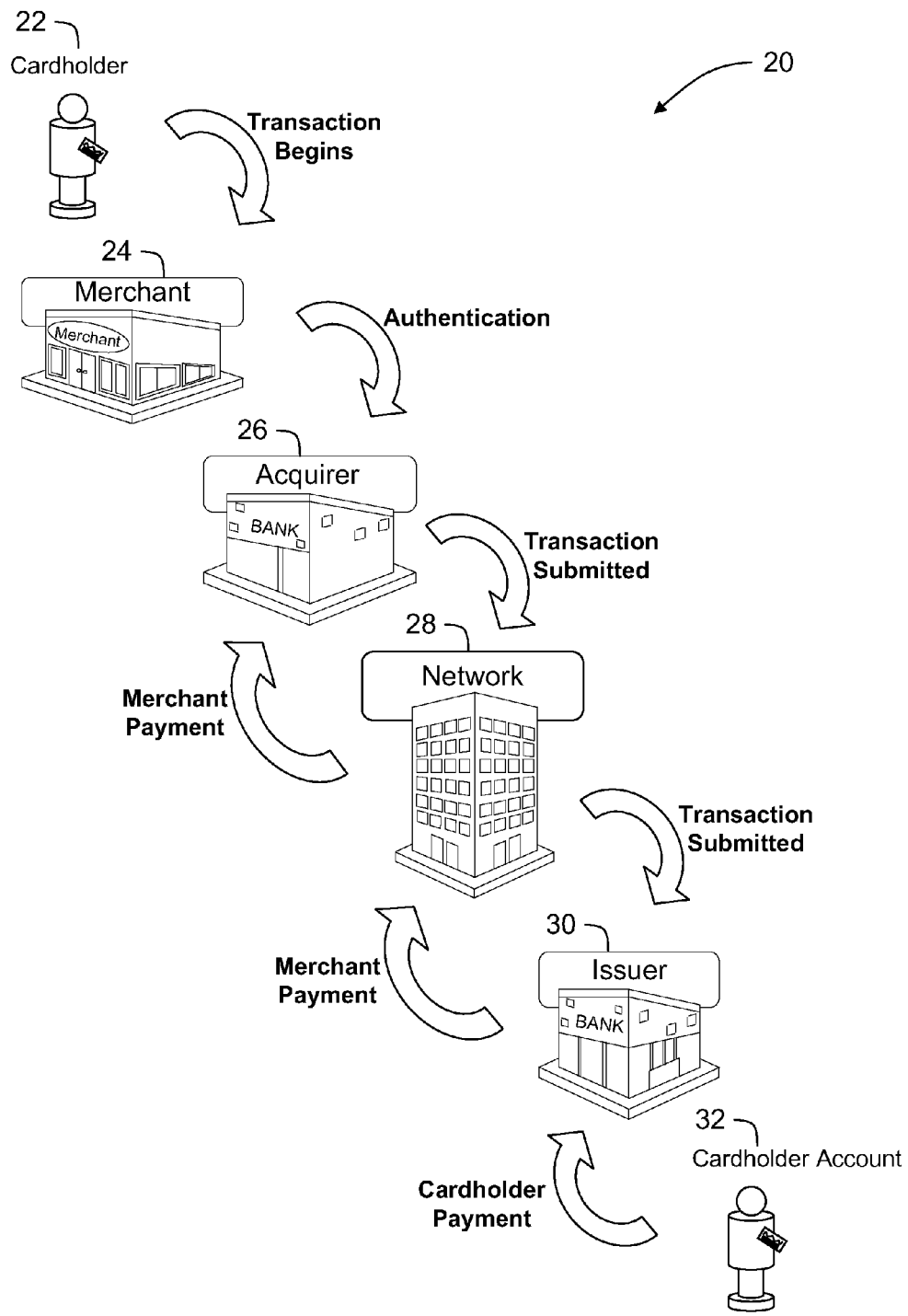
FIG. 1 is a schematic diagram illustrating an exemplary multi-party payment card industry system for enabling ordinary payment-by-card transactions in which the merchants and issuer do not need to have a one-to-one special relationship.

FIG. 1 is a schematic diagram 20 illustrating an exemplary multi-party payment card industry system for enabling payment-by-card transactions in which the merchants and issuer do not need to have a one-to-one special relationship. The present invention relates to a payment card system, such as a credit card payment system and/or a debit card payment system using an interchange network 28, such as the MasterCard® interchange network. The MasterCard® interchange network is a set of proprietary communications standards promulgated by MasterCard International Incorporated® for the exchange of financial transaction data and settlement of funds between financial institutions that are members of MasterCard International Incorporated®. (MasterCard is a registered trademark of MasterCard International Incorporated located in Purchase, N.Y.).

In a typical credit payment card system, a financial institution 30 called the "issuer" issues a payment card, such as a credit card, to a consumer, who uses the payment card to tender payment for a purchase from a merchant 24. To accept payment with the credit card, merchant 24 must normally establish an account with a financial institution 26 that is part of the financial payment system. Financial institution 26 is usually called the "acquirer", the "merchant bank", the "acquiring bank", or the "acquirer bank". When a consumer 22 tenders payment for a purchase with a credit card (also known as a financial transaction card), the merchant 24 requests authorization from the acquirer 26 for the amount of the purchase. The request may be performed over the telephone, but is usually performed through the use of a point-of-sale terminal, which reads the consumer's account information from the magnetic stripe, chip, or embossed characters on the credit card and communicates electronically with the transaction processing computers of acquirer 26. Alternatively, acquirer 26 may authorize a third party (not shown in FIG. 1) to perform transaction processing on its behalf. In this case, the point-of-sale terminal will be configured to communicate with the third party. Such a third party is usually called a "merchant processor" or an "acquiring processor" or a "third party processor."

Using interchange network 28, the computers of the acquirer 26 or the merchant processor will communicate with the computers of issuer 30 to determine whether the consumer's account is in good standing and whether the purchase is covered by the consumer's available credit line. Based on these determinations, the request for authorization will be declined or accepted. If the request is accepted, an authorization code is issued to the merchant 24.

When a request for authorization is accepted, the available credit line of consumer's account 32 is decreased. Normally, a charge for a credit card transaction is not posted immediately to a consumer's account because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If a consumer cancels a transaction before it is captured, a "void" is generated. If a consumer returns goods after the transaction has been captured, a "credit" is generated. Issuer 30 stores the credit card transaction information, such as the type of merchant, amount of purchase, date of purchase, in a data warehouse.

After a transaction is captured, the transaction is settled between merchant 24, acquirer 26, and issuer 30. Settlement refers to the transfer of financial data or funds between an account of merchant 24, acquirer 26, and issuer 30. Usually, transactions are captured and accumulated into a "batch," which is settled as a group. More specifically, a transaction is typically settled between issuer 30 and interchange network 28, and then between interchange network 28 and the acquirer 26, and then between acquirer 26 and the merchant 24.

A typical debit payment card system includes the same parties shown in diagram 20. However, when a consumer 22 tenders payment for a purchase with a debit card, merchant 24 requests authorization and settlement from acquirer 26 in a single request. The authorization/settlement request is forwarded by acquirer 26, via payment network 28, to issuer 30. If issuer 30 accepts the authorization/settlement request, issuer 30 transfers funds from cardholder account 32 to acquirer 26 via payment network 28. No separate settlement process is required.

Financial transaction cards or payment cards can refer to credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 2:
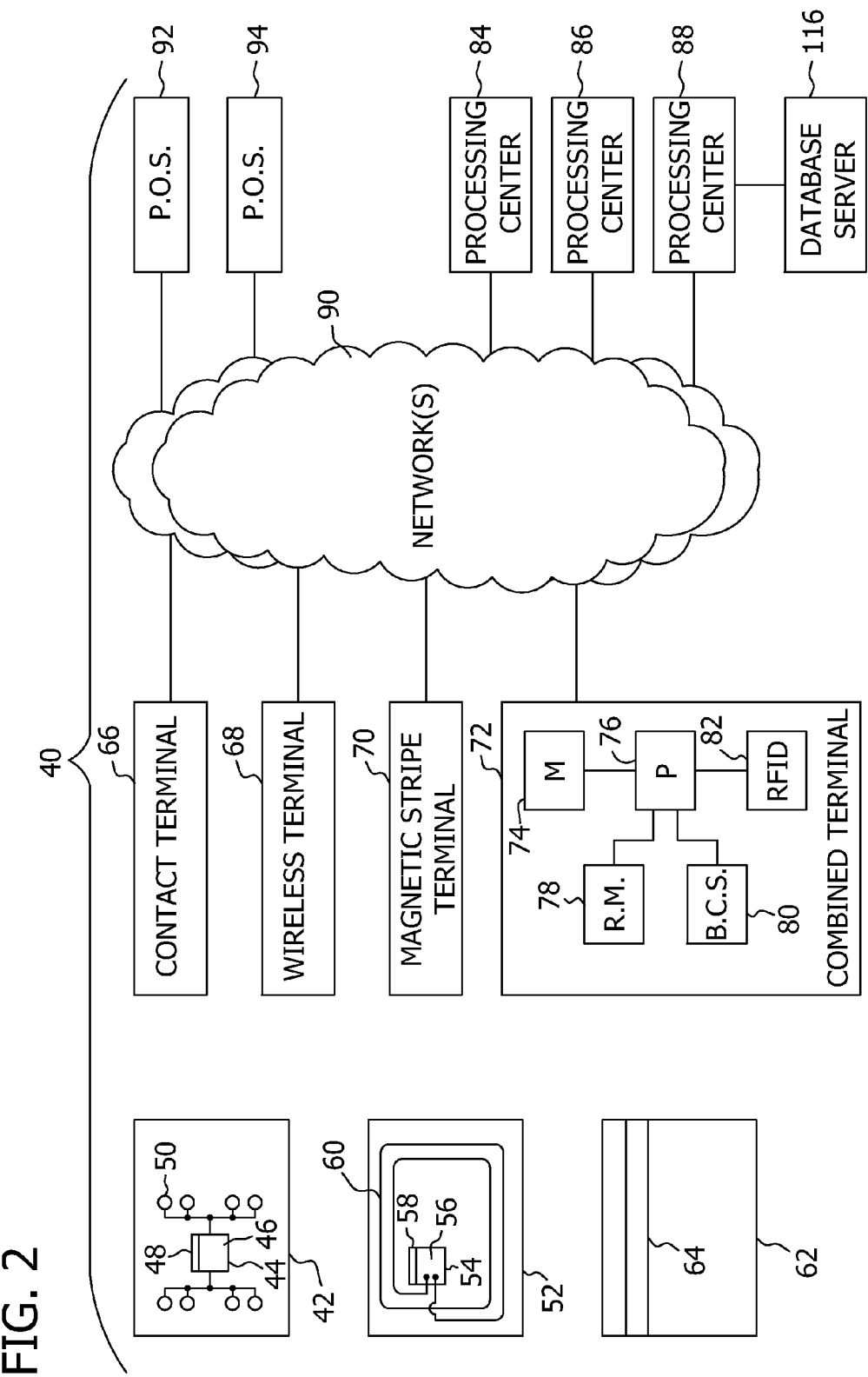
FIG. 2 is a block diagram of an embodiment of a payment system according to one aspect of the present invention, and including various possible components of the system.

FIG. 2 depicts an exemplary embodiment of a system 40, according to an aspect of the present invention, and including various possible components of the system. System 40 can include one or more different types of portable payment devices. For example, one such device can be a contact device such as card 42. Card 42 can include an integrated circuit (IC) chip 44 having a processor portion 46 and a memory portion 48. A plurality of electrical contacts 50 can be provided for communication purposes. In addition to or instead of card 42, system 40 can also be designed to work with a contactless device such as card 52. Card 52 can include an IC chip 54 having a processor portion 56 and a memory portion 58. An antenna 60 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 42, 52 are exemplary of a variety of devices that can be employed with techniques of the present invention. Other types of devices could include a conventional card 62 having a magnetic stripe 64, an appropriately configured cellular telephone handset, a key fob (e.g., including an IC chip), and the like. Indeed, techniques of the present invention can be adapted to a variety of different types of cards, terminals, and other devices.

The ICs 44, 54 can contain processing units 46, 56 and memory units 48, 58. Preferably, the ICs 44, 54 can also include one or more of control logic, a timer, and input/output ports. Such elements are well known in the IC art and are not separately illustrated. One or both of the ICs 44, 54 can also include a co-processor, again, well-known and not separately illustrated. The control logic can provide, in conjunction with processing units 46, 56, the control necessary to handle communications between memory unit 48, 58 and the input/output ports. The timer can provide a timing reference signal from processing units 46, 56 and the control logic. The co-processor could provide the ability to perform complex computations in real time, such as those required by cryptographic techniques.

The memory portions or units 48, 58 may include different types of memory, such as volatile and non-volatile memory and read-only and programmable memory. The memory units can store transaction card data such as, e.g., a user's primary account number ("PAN") and/or personal identification number ("PIN"). The memory portions or units 48, 58 can store the operating system of the cards 42, 52. The operating system loads and executes applications and provides file management or other basic card services to the applications. One operating system that can be used to implement the present invention is the MULTOS® operating system licensed by MAOSCO Limited. (MAOSCO Limited. St. Andrews House, The Links, Kelvin Close, Birchwood, Warrington, WA3 7PB. United Kingdom) Alternatively, JAVA CARD®-based operating systems, based on JAVA CARD® technology (licensed by Sun Microsystems, Inc., 462 Network Circle, Santa Clara, Calif. 95054 USA), or proprietary operating systems available from a number of vendors, could be employed. Preferably, the operating system is stored in read-only memory ("ROM") within memory portion 48, 58. In an alternate embodiment, flash memory or other non-volatile and/or volatile types of memory may also be used in the memory units 48, 58.

As noted, cards 42, 52 are examples of a variety of payment devices that can be employed with techniques of the present invention. The primary function of the payment devices may not be payment, for example, they may be cellular phone handsets that implement techniques of the present invention. Such devices could include cards having a conventional form factor, smaller or larger cards, cards of different shape, key fobs, personal digital assistants (PDAs), appropriately configured cell phone handsets, or indeed any device with the capabilities to implement techniques of the present invention. The cards, or other payment devices, can include body portions (e.g., laminated plastic layers of a payment card, case or cabinet of a PDA, chip packaging, and the like), memories 48, 58 associated with the body portions, and processors 46, 56 associated with the body portions and coupled to the memories. The memories 48, 58 can contain appropriate applications. The processors 46, 56 can be operative to facilitate execution of one or more method steps. The applications can be, for example, application identifiers (AIDs) linked to software code in the form of firmware plus data in a card memory such as an electrically erasable programmable read-only memory (EEPROM). Again, note that "smart" cards are not necessarily required and a magnetic stripe (or other technology) card can be employed, as discussed below.

A number of different types of terminals can be employed with system 40. Such terminals can include a contact terminal 66 configured to interface with contact-type device 42, a wireless terminal 68 configured to interface with wireless device 52, a magnetic stripe terminal 70 configured to interface with a magnetic stripe device 62, or a combined terminal 72. Combined terminal 72 is designed to interface with any type of device 42, 52, 62. Some terminals can be contact terminals with plug-in contactless readers. Combined terminal 72 can include a memory 74, a processor portion 76, a reader module 78, and optionally an item interface module such as a bar code scanner 80 and/or a radio frequency identification (RFID) tag reader 82. Items 74, 78, 80, 82 can be coupled to the processor 76. Note that the principles of construction of terminal 72 are applicable to other types of terminals and are described in detail for illustrative purposes. Reader module 78 can be configured for contact communication with card or device 42, contactless communication with card or device 52, reading of magnetic stripe 64, or a combination of any two or more of the foregoing (different types of readers can be provided to interact with different types of cards e.g., contacted, magnetic stripe, or contactless). Terminals 66, 68, 70, 72 can be connected to one or more processing centers 84, 86, 88 via a computer network 90. Network 90 could include, for example, the Internet, or a proprietary network. More than one network could be employed to connect different elements of the system. Processing centers 84, 86, 88 can include, for example, a host computer of acquirer 26, payment network 28, and/or issuer 30. Further details regarding one specific form of network are provided below with respect to FIGS. 3-6.

Many different retail or other establishments, represented by points-of-sale 92, 94, can be connected to network 90. In one or more embodiments of the invention, it is believed preferable that various establishments interface with a telecommunications network, such as a virtual private network (VPN), via one or more machines which are then connected to the network. This will be discussed further below. Each such establishment can have one or more terminals. Further, different types of portable payment devices, terminals, or other elements or components can combine or "mix and match" one or more features depicted on the exemplary devices in FIG. 2.

Portable payment devices can facilitate transactions by a user with a terminal, such as 66, 68, 70, 72, of a system such as system 40. Such a device can include a processor, for example, the processing units 46, 56 discussed above. The device can also include a memory, such as memory portions 48, 58 discussed above, that is coupled to the processor. Further, the device can include a reader module 78 that is coupled to the processor and configured to interface with a terminal such as one of the terminals 66, 68, 70, 72. The reader module 78 can include, for example, the contacts 50 or antennas 60 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

The portable device can include a body portion. For example, this could be a laminated plastic body (as discussed above) in the case of "smart" cards 42, 52, or the handset chassis and body in the case of a cellular telephone.

It will be appreciated that the terminals 66, 68, 70, 72 are examples of terminal apparatuses for interacting with a payment device of a cardholder or consumer 22 (shown in FIG. 1) in accordance with one or more exemplary embodiments of the present invention. The apparatus can include a processor such as processor 76, a memory such as memory 74 that is coupled to the processor, and a reader module such as 78 that is coupled to the processor and configured to interface with the portable apparatuses 42, 52, 62. The processor 76 can be operable to communicate with portable payment devices of a user via the reader module 78. The terminal apparatuses can function via hardware techniques in processor 76, or by program instructions stored in memory 74. Such logic could optionally be provided from a central location such as processing center 84 over network 90. In some instances, the aforementioned bar code scanner 80 and/or RFID tag reader 82 can be provided, and can be coupled to the processor, to gather attribute data, such as a product identification, from a UPC code or RFID tag on a product to be purchased. In some environments, such as, by way of example and not limitation, a transit system with a fixed fare (or a fare that depends on factors such as the length of the ride), items 80 and 82 are not needed, since, e.g., only one item can be purchased (the fixed-fare ride), identification can occur via other means, or the fare amount depends on the length of the trip rather than a specific product identification.

The above-described devices 42, 52 can be ISO 7816-compliant contact cards or devices or ISO 8843-compliant proximity cards or devices. In operation, card 52 can be touched or tapped on the terminal 68 or 72, which then contactlessly transmits the electronic data to the proximity IC chip in the card 52 or other wireless device. A card 62 with a magnetic stripe 64 can be swiped in a well-known manner.

One or more of the processing centers 84, 86, 88 can include a database server 116 for storing information of interest.

Figure 3:
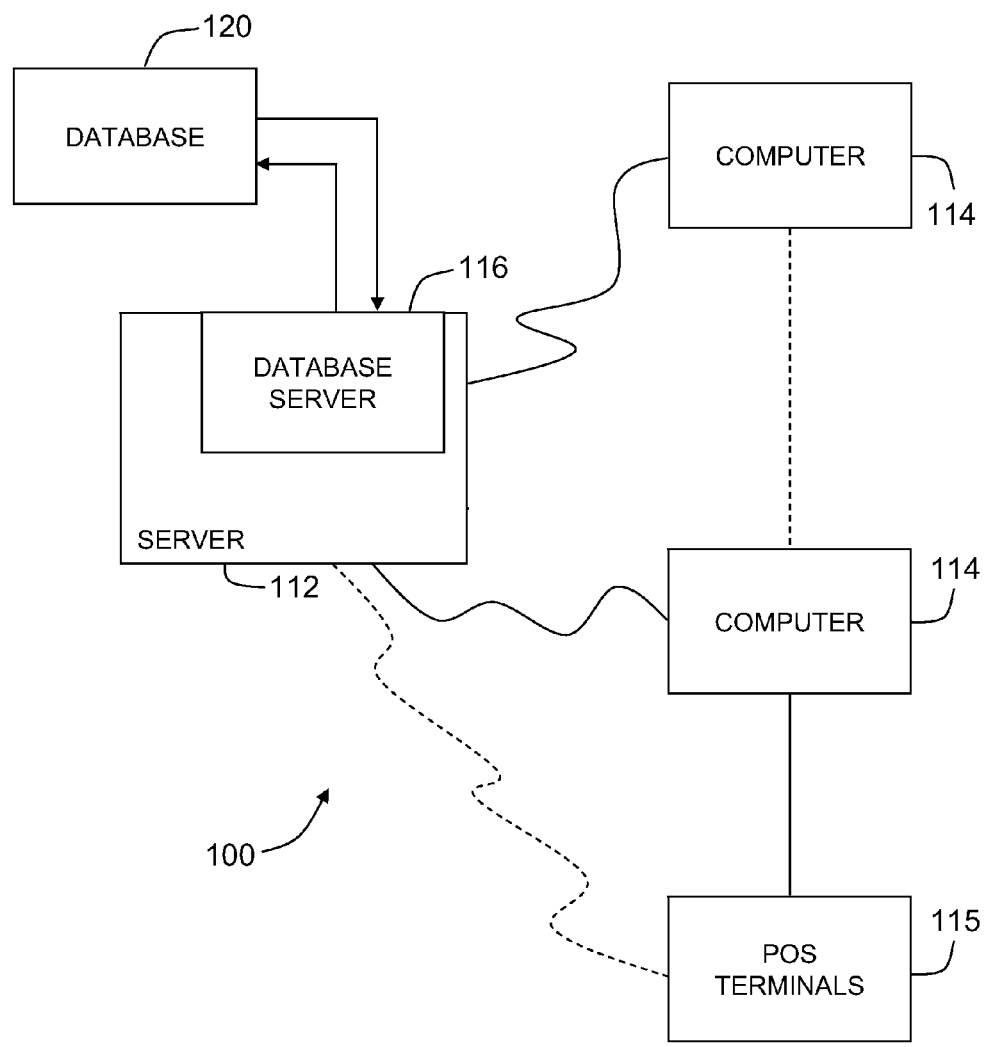
FIG. 3 is a simplified block diagram of an exemplary embodiment of a server architecture of a payment system for processing payment-by-card transactions, in accordance with one embodiment of the present invention.

FIG. 3 is a simplified block diagram of an exemplary payment system 100 for processing payment-by-card transactions, in accordance with one embodiment of the present invention. System 100 may, for example, include processing center 88 (shown in FIG. 2). In one embodiment, system 100 is a payment card system, also referred to as a financial transaction payment system, used for storing transaction data and/or account data of users, within a payment card program used by cardholder. In another embodiment, system 100 is a payment card system configured to process a transaction initiated by a cardholder using a payment card, such as those described in FIG. 2, determine whether the cardholder engaging in the transaction is registered within the system, access and/or store the data related to the transaction, authorize or deny the transaction, and complete the transaction.

More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through various interfaces including a network, such as a local area network (LAN) or a wide area network (WAN), dial-in-connections, cable modems, and special high-speed ISDN lines. Client systems 114 could be any device capable of interconnecting to the Internet, including a personal computer, a mobile internet device, an internet-enabled phone, a personal digital assistant (PDA), or any other computer device. A database server 116 is connected to a database 120 containing information related to a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized (e.g., in a distributed database configuration).

System 100 also includes point-of-sale (POS) terminals 115, which are connected to client systems 114 and may be connected to server system 112. POS terminals 115 are interconnected to the Internet through many interfaces including a network, such as a local area network (LAN) or a wide area network (WAN), dial-in-connections, cable modems and special high-speed ISDN lines. POS terminals 115 could be any device capable of interconnecting to the Internet and includes an input device capable of reading information from a consumer's financial transaction card.

As discussed herein, database 120 stores information relating to cardholders. Database 120 may also store transaction data and/or account data generated as part of sales activities conducted over the bankcard network including data relating to merchants, account holders or customers, and purchases. Database 120 may also store data relating to merchants, account holders, customers, and purchases. Database 120 may also store data relating to a list of merchants, merchant identifiers, product codes, transaction terms, financing data, and any other data related to operation of system 100. Database 120 may include a single database having separated sections or partitions or may include multiple databases, each being separate from one another.

In the example embodiment, one of client systems 114 may be associated with an acquirer while another one of client systems 114 may be associated with an issuer, POS terminal 115 may be associated with a participating merchant, and server system 112 may be associated with the interchange network.

Figure 4:
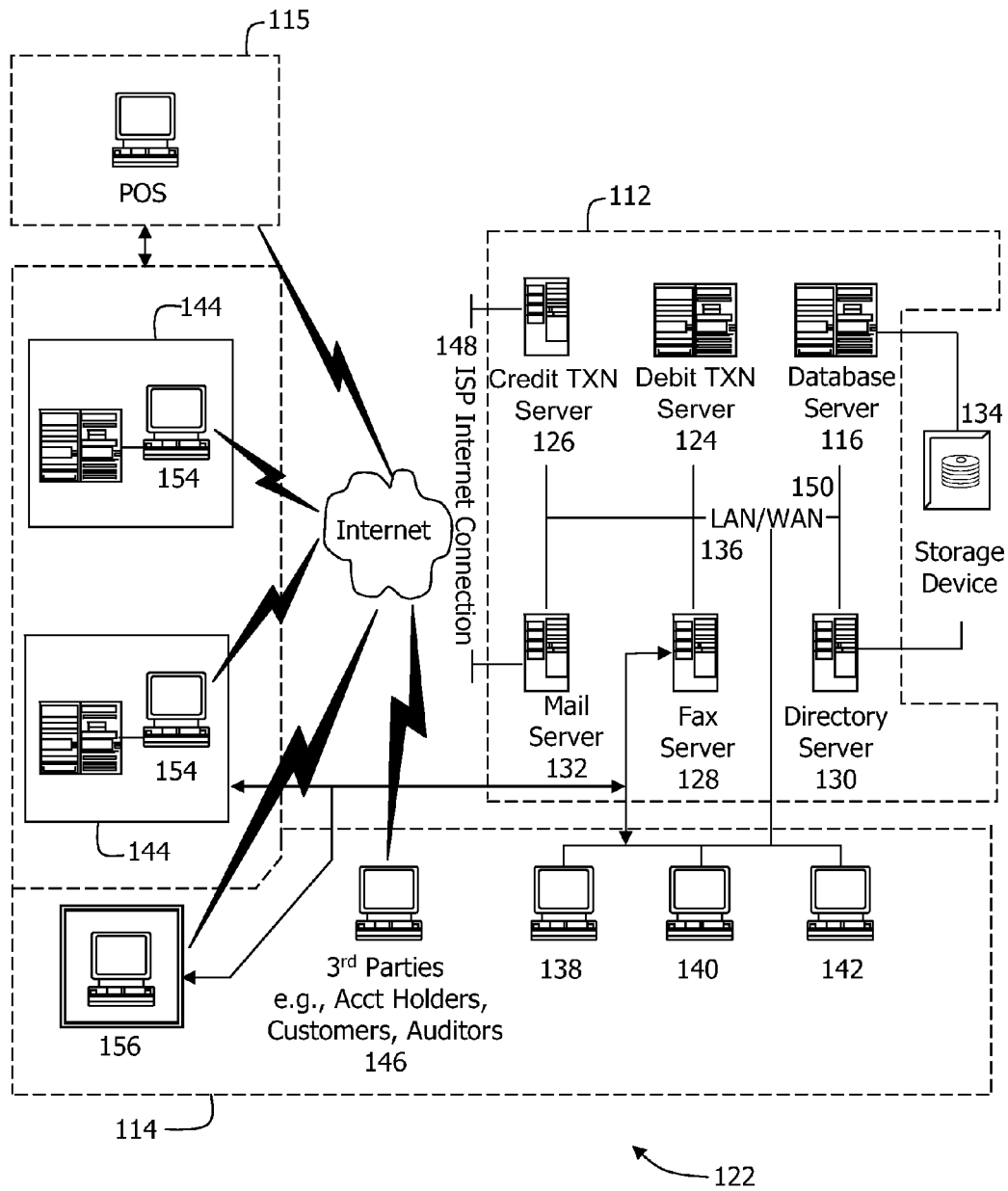
FIG. 4 is an expanded block diagram of an exemplary embodiment of a server architecture of a payment system, in accordance with one embodiment of the present invention.

FIG. 4 is an expanded block diagram of an exemplary embodiment of a server architecture of a payment system 122 for processing payment-by-card transactions, in accordance with one embodiment of the present invention. Components in system 122, identical to components of system 100 (shown in FIG. 3), are identified in FIG. 4 using the same reference numerals as used in FIG. 3. System 122 includes server system 112, client systems 114, and POS terminals 115. Server system 112 further includes database server 116, a debit transaction server 124, a credit transaction server 126, a fax server 128, a directory server 130, and a mail server 132. A storage device 134 is coupled to database server 116 and directory server 130. Storage device 134 is any computer-operated hardware for storing and/or retrieving data. In some embodiments, credit transaction server 126 and database server 116 are provided by a single device.

Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 5:
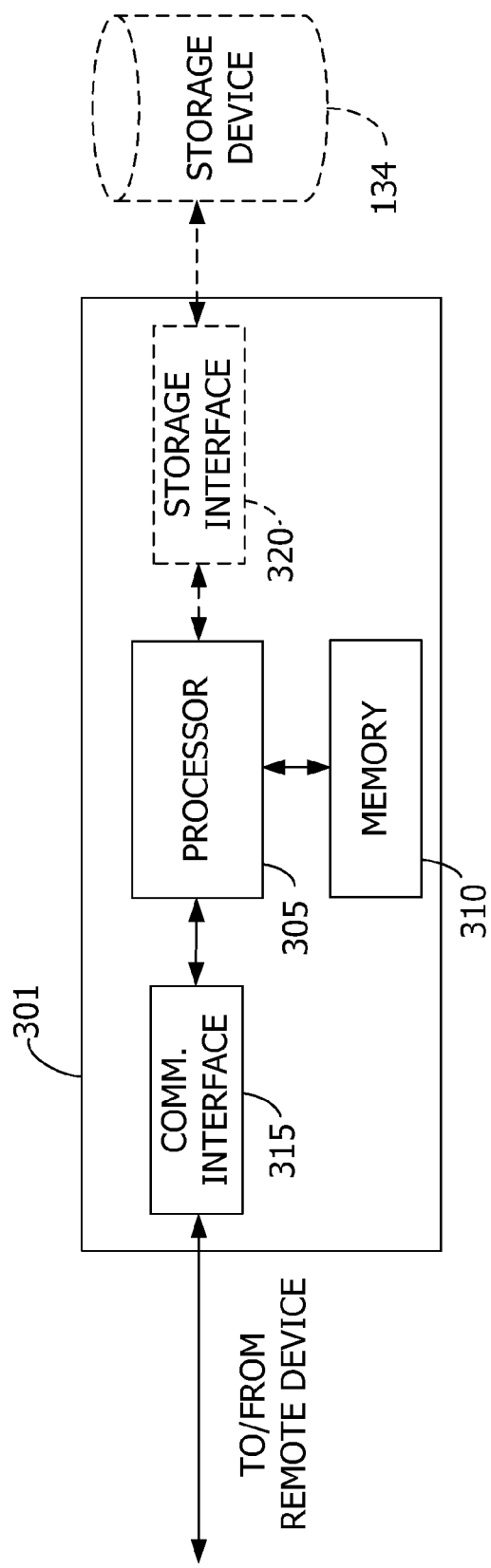
FIG. 5 illustrates an exemplary hardware configuration of a server system shown in FIGS. 3 and 4.

FIG. 5 illustrates an exemplary hardware configuration of a server computer device 301 such as at least one of the following: server system 112 (shown in FIG. 4), database server 116, debit transaction server 124, credit transaction server 126, fax server 128, directory server 130, and mail server 132.

Server computer device 301 also includes a processor 305 for executing instructions. Instructions may be stored in a memory area 310, for example. Processor 305 may include one or more processing units (e.g., in a multi-core configuration).

Processor 305 is operatively coupled to a communication interface 315 such that server computer device 301 is capable of communicating with a remote device such as POS terminal 115, one or more of client systems 114, another server computer device 301, and/or any other computer device. For example, communication interface 315 may receive requests from POS terminal 115 via the Internet, as illustrated in FIGS. 2 and 4.

Processor 305 may also be operatively coupled to a storage device 134. Storage device 134 is any computer-operated hardware suitable for storing and/or retrieving data. In some embodiments, storage device 134 is integrated in server computer device 301. For example, server computer device 301 may include one or more hard disk drives as storage device 134. In other embodiments, storage device 134 is external to server computer device 301 and may be accessed by a plurality of server computer devices 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Figure 6:
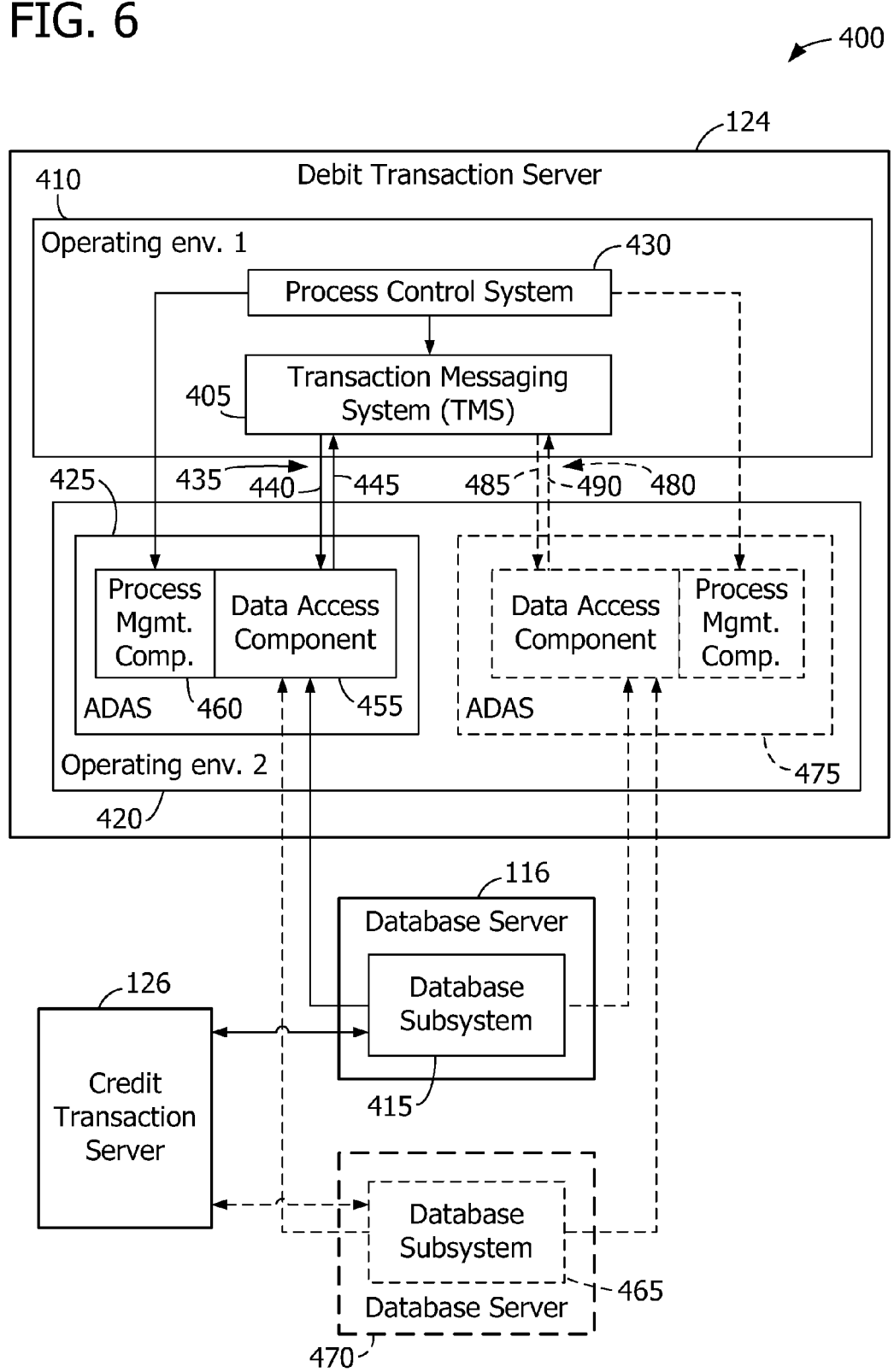
FIG. 6 is a block diagram of an exemplary embodiment of a transaction processing system in connection with the payment system shown in FIG. 4, in accordance with one embodiment of the present invention.

FIG. 6 is a block diagram of an exemplary embodiment of a transaction processing system 400 included within the payment system shown in FIGS. 3 and 4, in accordance with one embodiment of the present invention. Transaction processing system 400 includes debit transaction server 124 (shown in FIG. 4), credit transaction server 126 (shown in FIG. 4), and database server 116 (shown in FIGS. 2-4). In some embodiments, credit transaction server 126 and database server 116 are provided by a single server computer device 301 (shown in FIG. 5) or are distributed together across a plurality of server computer devices 301.

Debit transaction server 124 includes a transaction messaging system 405 executing within a first computer operating environment 410. Transaction messaging system 405 is in communication with POS terminals 115 and/or client systems 114 (shown in FIGS. 3 and 4). In the exemplary embodiment, debit transaction server 124 is or includes a server computer device 301, and transaction messaging system 405 communicates with POS terminals and/or client systems 114 via communication interface 315 (shown in FIG. 5).

Transaction messaging system 405 is programmed to receive a transaction authorization request message from acquirer 26 or directly from merchant 24 and forward the message to issuer 30. Transaction messaging system 405 requires access to data from at least a database subsystem 415 of database server 116 prior to forwarding a transaction authorization request message. However, database subsystem 415 is not directly accessible to transaction messaging system 405. For example, transaction messaging system 405 may be part of debit transaction server 124, and database subsystem may be part of credit transaction server 126.

In the exemplary embodiment, first computer operating environment 410 does not provide a facility for executing software that can communicate with database subsystem 415 and/or database server 116. To establish communication between transaction messaging system 405 and database subsystem 415, a second computer operating environment 420, such as an Open System Services (OSS) instance, is provided on debit transaction server 124. Second computer operating environment 420 executes an account data access system (ADAS) 425. Unlike first computer operating environment 410, second computer operating environment 420 enables access to database subsystem 415. Furthermore, debit transaction server 124 provides at least some interaction between first computer operating environment 410 and second computer operating environment 420. For example, first computer operating environment 410 may include a process control subsystem 430 for performing process management (e.g., startup, shutdown, and/or execution monitoring) over software executing in second computer operating environment 420. In addition, or in the alternative, one or more communication channels (e.g., message queues) may be established in either direction between first computer operating environment 410 and second computer operating environment 420.

In the exemplary embodiment, a message queue pair 435 is created for each instance of account data access system 425 in second computer operating environment 420. A first message queue 440 of the pair is written to by transaction messaging system 405 in first computer operating environment 410 and read by account data access system 425 in second computer operating environment 420. A second message queue 445 is written to by account data access system 425 and read by transaction messaging system 405. In this embodiment, transaction messaging system 405 is programmed to receive a transaction authorization request message from acquirer 26 (or directly from merchant 24), request account data from account data access system 425 via first message queue 440, receive the account data from account data access system 425 via second message queue 445, and validate the transaction based on the account data. Account data access system 425 is programmed to receive the request via first message queue 440, execute a query against database subsystem 415, and return account data based on at least one query result via second message queue 445.

In one example embodiment, interchange network 28 validates a transaction based on card verification code (CVC) data (e.g., a CVC value), and a transaction counter value associated with a primary account number (PAN). When presented by cardholder 22, the payment card provides the CVC value to POS terminal 115 or merchant 24. For example, the payment card may provide a CVC3 value, which is either static (e.g., stored on a magnetic stripe on the payment card) or dynamic (e.g., calculated by a microchip embedded in the payment card). POS terminal 115 includes the CVC value in the transaction authorization request message that it transmits to acquirer 26. Transaction messaging system 405 receives the transaction authorization request message from acquirer 26.

Transaction messaging system 405 recognizes the CVC value within the transaction authorization request message. In response to the received transaction authorization request message, transaction messaging system 405 provides the PAN from the transaction authorization request message and requests (e.g., via message queue 440) a transaction counter value from account data access system 425. Account data access system 425, in turn, executes a query in database subsystem 415 for a transaction counter value using the PAN as an input parameter. For example, account data access system 425 may execute an ad hoc query, a compiled query, or a stored procedure in database subsystem 415.

In response, database subsystem 415 returns to account data access system 425 the transaction counter value corresponding to the PAN. Account data access system 425 returns (e.g., via message queue 445) the transaction counter value to transaction messaging system 405. Transaction messaging system 405 validates the transaction based on the transaction counter value, the CVC value, and/or other transaction data from the transaction authorization request message. If the validation fails, transaction messaging system 405 responds to the transaction authorization request message by transmitting a validation failure message to acquirer 26.

If the validation is successful, transaction messaging system 405 requests (e.g., via message queue 440) an update (e.g., an increment) to the transaction counter value from account data access system 425. Account data access system 425 executes an update statement in database subsystem 415 to update the transaction counter value corresponding to the PAN. Optionally, account data access system 425 returns (e.g., via message queue 445) an update acknowledgment to transaction messaging system 405, indicating whether the update command was executed successfully. Transaction messaging system 405 then forwards the transaction authorization request message to issuer 30, and the process continues as usual.

In an alternative embodiment, if the validation fails, transaction messaging system 405 transmits a validation failure message to issuer 30, including at least a portion of the data from the transaction authorization request message. Transaction messaging system 405 receives a validation failure response message from issuer 30, which includes a transaction termination indicator. The transaction termination indicator indicates whether transaction messaging system 405 should continue processing the transaction. If the transaction termination indicator indicates that transaction messaging system 405 should not continue processing the transaction, transaction messaging system 405 responds to the transaction authorization request message by transmitting a validation failure message to acquirer 26. If the transaction termination indicator indicates that transaction messaging system 405 should continue processing the transaction, transaction messaging system 405 requests an update to the transaction counter value from account data access system 425 and forwards the transaction authorization request message to issuer 30, as described above.

In some embodiments, issuer 30 issues cardholder 22 a "virtual" PAN in addition to a conventional, "actual" PAN, and the payment card includes this virtual PAN. Interchange network 28 includes, in database subsystem 415, an association between the virtual PAN and the actual PAN. In such embodiments, the PAN provided by payment card to POS terminal 115 is the virtual PAN. The virtual PAN is included in the transaction authorization request message that is eventually received by transaction messaging system 405. Transaction messaging system 405 recognizes the PAN as a virtual PAN. For example, one or more numeric ranges of PANs may be designated for virtual PANs, and transaction messaging system 405 may determine that the received PAN is within a virtual PAN range.

Transaction messaging system 405 provides the virtual PAN as an input parameter and requests (e.g., via message queue 440) an actual PAN from account data access system 425. Account data access system 425, in turn, executes a query in database subsystem 415 for the actual PAN using the virtual PAN as an input parameter. This may be referred to as "PAN mapping". For example, as discussed above, account data access system 425 may execute an ad hoc query, a compiled query, or a stored procedure in the database. In response, database subsystem 415 returns to account data access system 425 the actual PAN associated with the virtual PAN. Account data access system 425 returns (e.g., via message queue 445) the actual PAN to transaction messaging system 405. Transaction messaging system 405 forwards the transaction authorization request message to issuer 30, including the actual PAN, and the process continues as usual.

In some embodiments, database subsystem 415 is distributed across multiple hosts. For example, database server 116 may include multiple server computer devices 301, such as IBM® mainframes. (IBM is a registered trademark of International Business Machines Corp., Armonk, N.Y.) Each server computer device 301 executes an instance of database subsystem 415 in a distributed configuration, such that account data is propagated among the server computer devices 301. Account data access system 425 is capable of executing queries in any of the instances of database subsystem 415. If account data access system 425 encounters an error while attempting to access data from a first instance of database subsystem 415 on one server computer device 301, account data access system 425 will attempt to access the data from a second instance of database subsystem 415. Account data access system 425 also repeatedly (e.g., occasionally, periodically, or continually) attempts to restore operable communication between itself and the first instance of database subsystem 415.

Similarly, account data access system 425 may monitor the state of communication between itself and the instances of database subsystem 415 independent of requests from transaction messaging system 405. For example, account data access system 425 may repeatedly (e.g., occasionally, periodically, or continually) determine the state of a network connection (e.g., operable or inoperable) to an instance of database subsystem 415. If account data access system 425 determines that the network connection to the instance is inoperable, account data access system 425 repeatedly attempts to restore the connection. Account data access system 425 attempts to execute queries only in instances of database subsystems 415 to which it has an operable connection.

In the example embodiment, a connection to an instance of database subsystem 415 may become inoperable after a period of inactivity. A subsequent attempt to use the connection will fail, introducing a delay while account data access system 425 re-establishes the connection to the instance of database subsystem 415 or re-executes the query in another instance of database subsystem 415. To prevent inactivity-induced failures, account data access system 425 detects inactivity in a connection to an instance of database subsystem 415 and, in response, executes a "keep-alive" query in that instance of database subsystem 415. For example, the keep-alive query may be a trivial query that imposes minimal processing cost on the instance of database subsystem 415 but suffices to prevent the connection from becoming inoperable. As another example, account data access system 425 may use an existing query (e.g., retrieving a transaction counter value or retrieving an actual PAN for a virtual PAN) as the keep-alive query, providing predefined and/or random values as query input parameters. The query may return no results, but execution of the query prevents the connection from becoming inoperable.

In the exemplary embodiment, account data access system 425 supports process management by process control system 430. Specifically, account data access system 425 includes a data access component 455 and a process management component 460. Data access component 455 includes instructions executable by a "virtual machine" (e.g., a Java virtual machine) for enabling communication between transaction messaging system 405 and database subsystem 415, as described above. Process management component 460 includes instructions executable directly by second computer operating environment 420 and is in communication with data access component 455 (e.g., according to the Java Native Interface specification), such that process management component 460 is capable of executing, monitoring, and/or terminating data access component 455. Process control system 430 of first computer operating environment 410 submits one or more process management commands to process management component 460 to execute, monitor, and/or terminate account data access system 425.

Process management component 460 optionally responds to a process management command by returning a process management response to process control system 430. For example, if process control system 430 submits a process management command directing process management component 460 to execute data access component 455, process management component 460 may respond with a process management response indicating whether execution of data access component 455 succeeded. As another example, process management component 460 may respond to a process management command directing it to monitor data access component 455 by returning a process management response indicating the current status (e.g., executing, not responding, and/or not executing) of data access component 455.

In one embodiment, process management component 460 includes a plurality of process management adapters. Each process management adapter is programmed to receive process management commands from a particular process control system 430, each of which may use a different communication protocol. For example, providing a process management adapter for process control systems 430 from two vendors enables deployment of account data access system 425 to server computer devices 301 and/or computer operating environments from either vendor. In some embodiments, process management component 460 defines a process management plugin interface, and each process management adapter is a process management plugin conforming to the process management plugin interface. Process control between a process control system 430 and account data access system 425 is facilitated by creating a process management plugin for process control system 430 and deploying the process management plugin to second computer operating environment 420, account data access system 425, and/or process management component 460.

In some embodiments, account data access system 425 is capable of connecting to a plurality of databases. For example, account data access system 425 may be programmed to access transaction counter values from database subsystem 415 of database server 116 and PAN data from a second database subsystem 465 of a second database server 470. Similarly, account data access system 425 may be programmed to access any database subsystems and/or database servers containing data required by transaction messaging system 405. The databases accessed by account data access system may reside on one or more server computer devices 301.

In some embodiments, multiple instances of account data access system 425 are executed in second computer operating environment 420. In an exemplary embodiment, account data access system 425 is a first account data access system, and message queue pair 435 is a first message queue pair. A second account data access system 475 is also executed in second computer operating environment 420, and a second message queue pair 480, including a first message queue 485 and a second message queue 490, is created to provide communication between first computer operating environment 410 and second computer operating environment 420. First account data access system 425 is associated with first message queue pair 435, and second account data access system 475 is associated with second message queue pair 480. Transaction messaging system 405 submits requests to available account data access system message queues 440 and 485 in an alternating or rotating manner. For example, if three message queues are available, transaction messaging system 405 submits a first request via the first queue, a second request via the second queue, a third request via the third queue, a fourth request via the first queue, and so on. The quantity of requests submitted via each queue is approximately equal.

In one embodiment, second computer operating environment 420 is upgraded from a first version of account data access software to a second version of account data access software without interrupting transaction processing by transaction messaging system 405. The upgrade process begins with second computer operating environment 420 executing one or more instances of first account data access system 425, which include a first version of account data access software. Each instance of first account data access system 425 corresponds to a message queue pair 435 in a first set of message queue pairs. One or more instances of second account data access system 475, each including a second version of the account data access software, are executed in second computer operating environment 420. A second set of message queue pairs 780 is created, with a message queue pair corresponding to each instance of second account data access system 475.

Additions to message queues 440 in the first set are disabled in first computer operating environment 410, such that message queues 485 in the second set are the only message queues available to transaction messaging system 405. All requests from transaction messaging system 405 are thereby directed to the instances of second account data access system 475. With no new requests entering the message queues 440 in the first set, each instance of first account data access system 425 processes requests from its corresponding message queue 440 until the message queue 440 is empty. When all the message queues in the first set are empty, the instances of first account data access system 425 are terminated. In an alternative embodiment, each instance of first account data access system 425 is terminated upon emptying its corresponding message queue 440. When all instances of first account data access system 425 have been terminated, second computer operating environment 420 is executing only instances of second account data access system 475, which include the second version of the account data access software. Message queues 440 in the first set may also be removed.

FIG. 7 illustrates a flowchart 500 of an exemplary process for processing a transaction in connection with the transaction processing system shown in FIG. 6, in accordance with one embodiment of the present invention. Step 505 includes receiving a transaction authorization request, e.g., including a virtual account number and/or a CVC value. Optional step 535 includes determining whether validation is required. Step 510 includes submitting a request for transaction data, e.g., an account number or a transaction counter value. Step 515 includes submitting a query for transaction data. Step 520 includes receiving query results. Step 525 includes submitting transaction data, e.g., the account number or the transaction counter value. Step 530 includes processing a transaction authorization request, e.g., validating and/or forwarding the authorization request. If validation failed, flowchart 500 continues to step 540 that includes transmitting a validation failure message, e.g., to an acquirer or an issuer. If validation did not fail, flowchart 500 continues to step 545 that includes continuing the processing of the transaction authorization request, e.g., updating a counter, forwarding the request.

The methods described herein and associated with the present invention may be encoded as executable instructions embodied in a computer readable medium, including, but not limited to, a storage device 134 and/or a memory area 310. Such instructions, when executed by a processor, cause the processor to perform at least a portion of one or more methods described.

While the invention has been described in terms of various specific embodiments, those skilled in the art will recognize that the invention can be practiced with modification within the spirit and scope of the claims.

What is claimed is:

1. A method for using a first computer device to access data from a database subsystem operating at a plurality of second computer devices, said method comprising:

executing, by the first computer device, a first computer operating environment and a second computer operating environment, wherein the first computer operating environment includes a process control system and a transaction messaging system (TMS), the TMS configured to receive debit card transaction authorization request messages originating from a plurality of point of sale devices, and wherein the second computer operating environment is configured to communicate with the database subsystem that is associated with a credit card processing system, wherein the first computer operating environment has a different communication protocol from the second computer operating environment;

executing, by the plurality of second computer devices, an instance of the database subsystem in a distributed configuration, the database subsystem at the plurality of second computer devices configured to execute in the second computer operating environment on the plurality of second computer devices;

executing, in the second computer operating environment, an account data access system (ADAS) on the first computer device, wherein the ADAS includes a process management component and a data access component, the data access component including instructions executable by a virtual machine in the second operating environment, wherein the process management component executes and monitors the data access component in response to process management commands from the process control system;

creating, by the first computer device, a message queue pair including a first message queue and a second message queue, wherein the first message queue is written to by the TMS and readable by the data access component, and wherein the second message queue is written to by the data access component and is readable by the TMS;

transmitting a request for data from the TMS in the first operating environment on the first computer device to the data access component in the second operating environment on the first computer device using the first message queue;

generating, by the ADAS, a query for the data from the database subsystem based on the request for the data;

executing, by the data access component in the second operating environment on the first computer device, the query for the data in any of the instances of the database subsystem in the second operating environment on one of the plurality of second computer devices;

receiving the requested data at the data access component in response to the query;

transmitting the requested data from the data access component in the second operating environment on the first computer device to the TMS in the first operating environment on the first computer device using the second message queue; and processing, by the TMS, a payment transaction in the first operating environment on the first computer device using the requested data.

2. The method of claim 1, wherein the first computer device is a debit transaction processing device and at least one of the plurality of second computer devices is a credit transaction processing device including an Open System Service (OSS), said method further comprising:

receiving a debit transaction authorization request corresponding to the payment transaction at the TMS; and executing a query for the data at the database subsystem operating at the credit transaction processing device, wherein the data includes at least one of a transaction counter value and a primary account number.

3. The method of claim 1, further comprising receiving, at the TMS, a transaction authorization request that corresponds to a payment transaction and includes a virtual account number, wherein transmitting the request for data comprises transmitting a request for an actual account number corresponding to the virtual account number, and wherein receiving the requested data comprises receiving the actual account number.

4. The method of claim 3, wherein the received transaction authorization request is a first transaction authorization request, and wherein processing the payment transaction comprises transmitting, to an issuer, a second transaction authorization request including the actual account number.

5. The method of claim 1, further comprising receiving, at the TMS, a transaction authorization request that corresponds to the payment transaction and includes a card verification code (CVC) value, said method further comprising validating the payment transaction using the CVC value.

6. The method of claim 5, wherein receiving the transaction authorization request comprises receiving the transaction authorization request including an account number, wherein transmitting the request for data comprises transmitting a request for a transaction counter value corresponding to the received account number, and wherein receiving the requested data comprises receiving the transaction counter value.

7. The method of claim 6, wherein processing the payment transaction comprises validating the payment transaction based on at least the transaction counter value.

8. The method of claim 7, further comprising, if said validating the transaction fails, responding to the transaction authorization request by transmitting a validation failure message.

9. The method of claim 7, further comprising, if said validating the transaction fails:

transmitting to an issuer a validation failure message; and processing the payment transaction based on a response to the validation failure message.

10. A system for using a first computer device to access data from a database subsystem operating at a plurality of second computer devices, said system comprising:

the first computer device comprising a processor; and the database subsystem for storing data, the database subsystem at the plurality of second computer devices configured to execute in a second computer operating environment, wherein the plurality of second computer devices execute an instance of the database subsystem in a distributed configuration, wherein said first computer device is configured to:
execute a first computer operating environment and the second computer operating environment, wherein the first computer operating environment includes a process control system and a transaction messaging system (TMS), the TMS configured to receive debit card transaction authorization request messages originating from a plurality of point of sale devices, and wherein the second computer operating environment is configured to communicate with the database subsystem that is associated with a credit card processing system, wherein the first computer operating environment has a different communication protocol from the second computer operating environment;
execute an account data access system (ADAS) on the first computer device, wherein the ADAS includes a process management component and a data access component, the data access component including instructions executable by a virtual machine in the second operating environment, wherein the process management component executes and monitors the data access component in response to process management commands from the process control system;
create a message queue pair including a first message queue and a second message queue, wherein the first message queue is written to by the TMS and readable by the data access component, and wherein the second message queue is written to by the data access component and is readable by the TMS;
transmit a request for data from the TMS in the first operating environment on the first computer device to the data access component in the second operating environment on the first computer device using the first message queue;
generate, by the ADAS, a query for the data from the database subsystem based on the request for data;
execute, by the data access component in the second operating environment on the first computer device, the query for the data in any of the instances of the database subsystem in the second operating environment on one of the plurality of second computer devices;
receive the requested data at the data access component in response to the query;
transmit the requested data from the data access component in the second operating environment on the first computer device to the TMS in the first, operating environment on the first computer device using the second message queue; and
process a payment transaction at the TMS in the first operating environment on the first computer device using the requested data.

11. The system of claim 10, wherein said first computer device is a debit transaction processing device and at least one of the plurality of second computer devices is a credit transaction processing device including an Open System Service (OSS), wherein said first computer device is further configured to:
receive, at the TMS, a debit transaction authorization request corresponding, to the payment transaction; and
execute a query for the data at the database subsystem operating at the credit transaction processing device, wherein the data includes at least one of a transaction counter value and a primary account number.

12. The system of claim 10, wherein said first computer device is further configured to:
receive, at the TMS, a transaction authorization request that corresponds to the payment transaction and includes a virtual account number;
transmit, from the TMS, a request for an actual account number corresponding to the virtual account number; and
receive, at the TMS, the requested data including the actual account number.

13. The system of claim 12, wherein the received transaction authorization request is a first transaction authorization request, and wherein said first computer device is further configured to transmit, to an issuer, a second transaction authorization request including the actual account number.

14. The system of claim 10, wherein said first computer device is further configured to:
receive, at the TMS, a transaction authorization request that corresponds to the payment transaction and includes a card verification code (CVC) value; and
validates the payment transaction using the CVC value.

15. The system of claim 14, wherein said first computer device is further configured to:
receive, at the TMS, the transaction authorization request including an account number;
transmit, from the TMS to the ADAS, a request for a transaction counter value corresponding to the received account number; and
receive, at the TMS, the transaction counter value.

16. The system of claim 15, wherein said first computer device is further configured to validate the payment transaction based on at least the transaction counter value.

17. The system of claim 16, wherein said first computer device is further configured to:
respond to the transaction authorization request by transmitting a validation failure message if the validation of the transaction fails.

18. The system of claim 16, wherein said first computer device is further configured to, if the validation of the transaction fails:
transmit to an issuer a validation failure message; and
process the payment transaction based on a response to the validation failure message.

19. The system of claim 10, wherein said ADAS is a first ADAS, and wherein said second computer operating environment is further programmed to execute a second ADAS.

20. The system of claim 19, wherein said processor is further programmed to provide a first and a second message queue pair providing communication between said first computer operating environment and said second computer operating environment, wherein said first message queue pair corresponds to said first ADAS, and wherein said second message queue pair corresponds to said second ADAS.

21. The system of claim 20, wherein said TMS alternatingly submits a plurality of requests for data to said first ADAS and said second ADAS via said first and second message queue pairs.

22. The system of claim 10, wherein said process management component comprises:

a first process management adapter programmed to receive a process management command from a first process control system using a first communication protocol; and a second process management adapter programmed to receive a process management command from a second process control system using a second communication protocol.

23. The system of claim 10, wherein the first computer device is further configured to:

detect inactivity in a connection between the ADAS and the database subsystem; and in response to the detected inactivity, execute, by the ADAS, a query at the database subsystem.

24. A computer program embodied on a computer readable medium for using a first computer device to access data from a database subsystem operating at a plurality of second computer devices, the database subsystem at the plurality of second computer devices configured to execute in a second computer operating environment, wherein the plurality of second computer devices execute an instance of the database subsystem in a distributed configuration, said program comprising at least one code segment that instructs the first computer device to:

execute a first computer operating environment and the second computer operating environment, wherein the first computer operating environment includes a process control system and a transaction messaging system (TMS). the TMS configured to receive debit card transaction authorization request messages originating from a plurality of point of sale devices, and wherein the second computer operating environment is configured to communicate with the database subsystem that is associated with a credit card processing system, wherein the first computer operating environment has a different communication protocol from the second computer operating environment;

execute an account data access system (ADAS) on the first computer device, wherein the ADAS includes a process management component and a data access component, the data access component including instructions executable by a virtual machine executing on the first computer device in the second operating environment, wherein the process management component executes and monitors the data access component in response to process management commands from the process control system;

create a message queue pair including a first message queue and a second message queue, wherein the first message queue is written to by the TMS and readable by the data access component, and wherein the second message queue is written to by the data access component and is readable by the TMS;

transmit a request for data from the TMS in the first operating environment on the first computer device to the data access component in the second operating environment on the first computer device using the first message queue;

generate, by the ADAS, a query for the data from the database subsystem based on the request for data;

execute, by the data access component in the second operating environment on the first computer device, the query for the data in any of the instances of the database subsystem in the second operating environment on one of the plurality of second computer devices;

receive the requested data at the data access component in response to the query;

transmit the requested data from the data access component in the second operating environment on the first computer device to the TMS in the first operating environment on the first computer device using the second message queue; and process a payment transaction at the TMS using the requested data.

25. A computer program in accordance with claim 24, wherein said first computer device is a debit transaction processing device and at least one of the plurality of second computer device is a credit transaction processing device including an Open System Service (OSS), wherein said computer program further comprises at least one code segment that instructs the first computer device to:

receive, at the TMS, a debit transaction authorization request corresponding to the payment transaction; and execute a query for the data at the database subsystem operating at the credit transaction processing device, wherein the data includes at least one of a transaction counter value and a primary account number.

26. A computer program in accordance with claim 24, wherein said computer program further comprises at least one code segment that instructs the first computer device to:

receive, at the TMS, a transaction authorization request that corresponds to the payment transaction and includes a virtual account number;

transmit, from the TMS, a request for an actual account number corresponding to the virtual account number; and receive, at the TMS, the requested data including the actual account number.

27. A computer program in accordance with claim 24, wherein said computer program further comprises at least one code segment that instructs the first computer device to:

receive, at the TMS, a transaction authorization request that corresponds to the payment transaction and includes a card verification code (CVC) value; and validates the payment transaction using the CVC value.

28. A computer program in accordance with claim 27, wherein said computer program further comprises at least one code segment that instructs the first computer device to:

receive, at the TMS, the transaction authorization request including an account number;

transmit, from the TMS to the ADAS, a request for a transaction counter value corresponding to the received account number; and receive, at the TMS, the transaction counter value.

29. A computer program in accordance with claim 28, wherein said computer program further comprises at least one code segment that instructs the first computer device to validate the payment transaction based on at least the transaction counter value.

30. A system for using a first computer device to access data from a database subsystem operating at a plurality of second computer devices, said system comprising:

the first computer device comprising a processor, the first computer device is a debit transaction processing device; and the database subsystem for storing data, the database subsystem executing at the plurality of second computer devices configured to execute in a second computer operating environment, wherein at least one of the plurality of the second computer devices is a credit transaction processing device, wherein the debit transaction processing device is configured to:

execute a first computer operating environment and the second computer operating environment, wherein the first computer operating environment includes a process control system and a transaction messaging system (TMS), the TMS configured to receive debit card transaction authorization request messages originating from a plurality of point of sale devices, wherein the database subsystem is not directly accessible by the TMS, and wherein the second computer operating environment is configured to communicate with the database subsystem that is associated with a credit card processing system, wherein the first computer operating environment has a different communication protocol from the second computer operating environment;

execute an account data access system (ADAS) on the first computer device, wherein the ADAS includes a process management component and a data access component, the data access component including instructions executable by a virtual machine executing in the second operating environment, wherein the process management component executes and monitors the data access component in response to process management commands from the process control system;

create a message queue pair including a first message queue and a second message queue, wherein the first message queue is written to by the TMS and readable by the data access component, and wherein the second message queue is written to by the data access component and is readable by the TMS;

receive, at the TMS in the first operating environment on the first computer device, a debit transaction authorization request corresponding to a payment transaction, the authorization request including a card verification code (CVC) value and an account number;

transmit a request for data from the TMS in the first operating environment on the first computer device to the data access component in the second operating environment on the first computer device using the first message queue;

generate, by the ADAS, a query for the data from the database system based on the request for data, the query including the CVC value and the account number;

execute, by the data access component in the second operating environment on the first computer device, the query for the data in any of the instances of the database subsystem operating in the second operating environment at the credit transaction processing device;

receive the requested data at the data access component in response to the query, the requested data including at least one of a transaction counter value and a primary account number;

transmit the requested data from the data access component in the second operating environment on the first computer device to the TMS in the first operating environment on the first computer device using the second message queue;

validate the payment transaction using the transaction counter value; and process the validated payment transaction at the TMS in the first operating environment on the first computer device using the requested data including the primary account number.

* * * * *